No. 718,564. PATENTED JAN. 13, 1903.
J. V., W. W. & W. CAMPTON.
CORN HARVESTER AND HUSKER.
APPLICATION FILED FEB. 18, 1902.
NO MODEL. 3 SHEETS—SHEET 1.
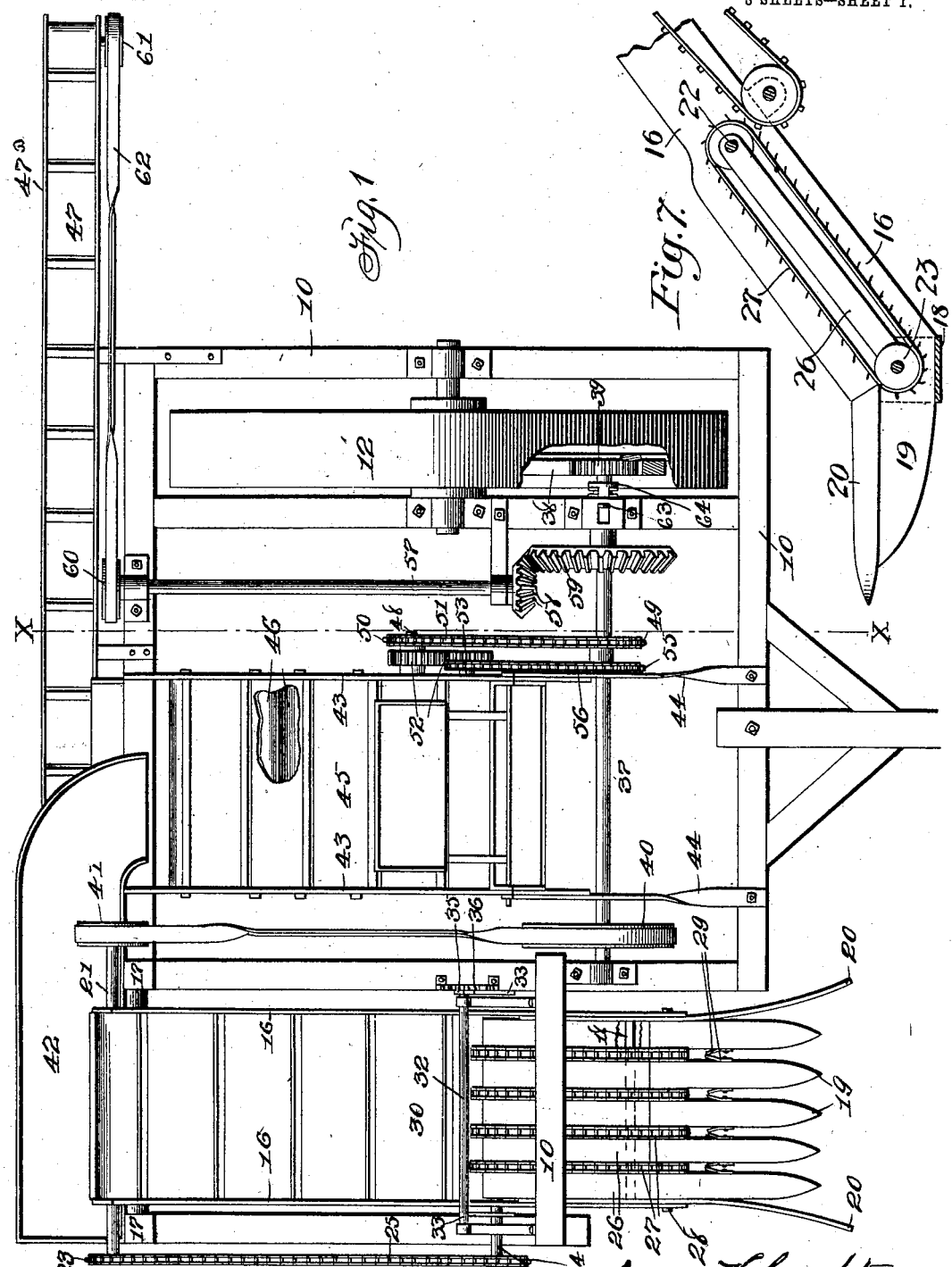

No. 718,564. PATENTED JAN. 13, 1903.
J. V., W. W. & W. CAMPTON.
CORN HARVESTER AND HUSKER.
APPLICATION FILED FEB. 18, 1902.
NO MODEL. 3 SHEETS—SHEET 2.
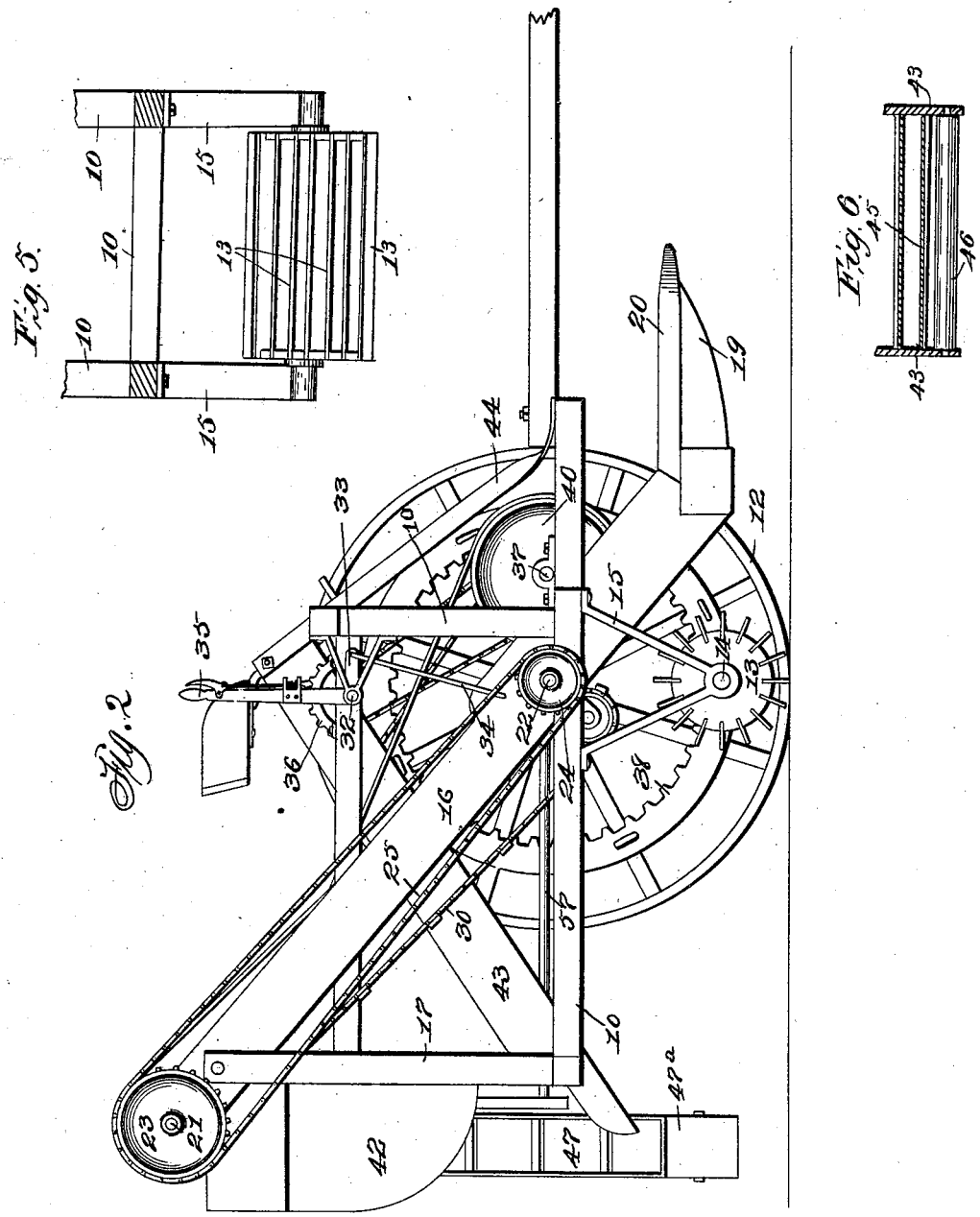

No. 718,564. PATENTED JAN. 13, 1903.
J. V., W. W. & W. CAMPTON.
CORN HARVESTER AND HUSKER.
APPLICATION FILED FEB. 18, 1902.
NO MODEL. 3 SHEETS—SHEET 3.
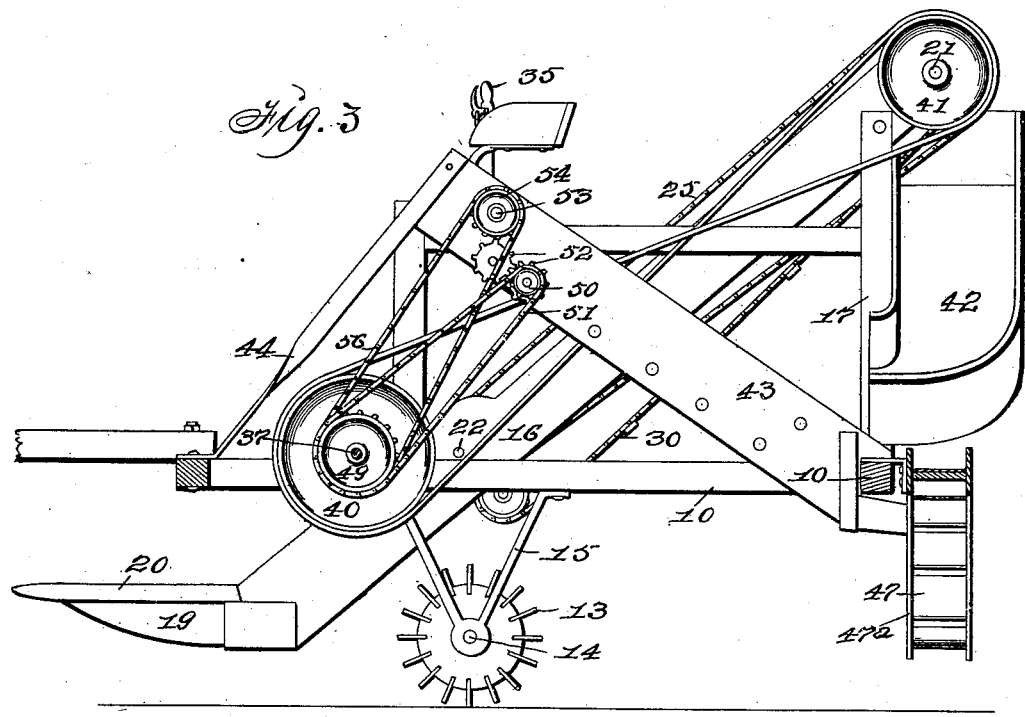
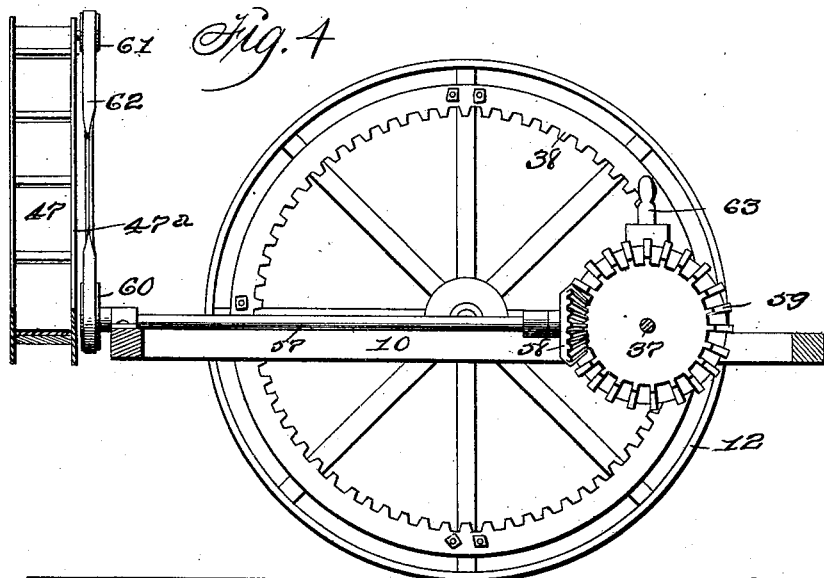

UNITED STATES PATENT OFFICE.

JAMES V. CAMPTON AND WILBUR W. CAMPTON, OF DES MOINES, IOWA, AND WILLIAM CAMPTON, OF ST. CLOUD, COLORADO.

CORN HARVESTER AND HUSKER.

SPECIFICATION forming part of Letters Patent No. 718,564, dated January 13, 1903.

Application filed February 18, 1902. Serial No. 94,673. (No model.)

*To all whom it may concern:*

Be it known that we, JAMES V. CAMPTON and WILBUR W. CAMPTON, residing in Des Moines, in the county of Polk and State of Iowa, and WILLIAM CAMPTON, residing at St. Cloud, Larimer county, Colorado, citizens of the United States, have invented a new and useful Corn Harvester and Husker, of which the following is a specification.

Our object is to hold the stalks in a row of corn in the field as required to prevent them from being pulled out of the ground and at the same time strip the ears of corn from the stalks and by means of two endless carriers elevate the ears to an inclined conveyer upon which the ears will by force of gravity descend to a third endless carrier that will lift the ears to the top of a plurality of husking-rollers, from which rollers the husked corn will fall upon a fourth endless carrier to be thereby delivered upon a wagon advanced in a parallel line with the machine as the ears are stripped from the stalks that are held and tread down by a tread-wheel that also serves as a traction-wheel for supporting and carrying the operative mechanisms.

Our invention consists in the construction, arrangement, and combination of elements and subcombinations with a carriage, as hereinafter set forth, pointed out in our claims, and illustrated in the accompanying drawings, in which—

Figure 1 is a top view of the machine and shows the relative positions of the different operative mechanisms relative to each other and the carriage-frame upon which they are mounted. Fig. 2 is a side view of the machine and the tread-wheel that holds stalks of corn to the ground when the ears are stripped from the stalks by mechanism in front and above the tread-wheel. Fig. 3 is a vertical sectional view on the line X X of Fig. 1 looking toward the husking-rollers and endless carriers that coöperate in delivering the ears to the husking-rollers. Fig. 4 is a vertical sectional view looking toward the driver-wheel and gearing connected therewith for actuating the endless carriers and husking-rollers. Fig. 5 is a sectional view on a vertical line in front of the tread-wheel, showing the form and position of the tread-wheel and the manner of connecting it with the frame as required, in combination with the driver-wheel on the other side of the machine to support and advance the machine on the ground. Fig. 6 is a transverse sectional view of Fig. 3 at the center of the frame that supports the husking-rollers and shows the position of the husking-rollers relative to the endless carrier that elevates the ears of corn to the top of the inclined frame and deposits them upon the upper end of the series of husking-rollers extended between the parallel parts of the endless carrier in such a manner that the ears of corn will by force of gravity descend on the husking-rollers as required to be stripped of their husks by the series of coacting husking-rollers that serve as an inclined plane to convey the corn to the elevating-carrier extending at right angles and upward from the lower end of the series of husking-rollers. Fig. 7 is a detail view that shows the connection between the parts that pick the ears of corn from the stalk and carry them upward and rearward.

The numeral 10 designates the carriage-frame, adapted in form and size for supporting the different coöperative devices mounted thereon. The axle of the driver-wheel 12 at one side of the frame is mounted in bearings fixed to parallel parts of the frame and the tread-wheel 13 on an axle 14 in bearers 15, fixed to the other side of the frame to extend downward, support the frame, and jointly serve as traction-wheels upon which the machine is advanced and operated. The diameter of the wheel 13 is less than its length, and its periphery has ribs extending from end to end in parallel position with its axis and adapted to extend squarely across cornstalks as the wheel treads upon them as the machine is advanced.

A frame adapted to support two endless carriers and ear-stripping devices is composed of two mating side pieces 16, pivotally connected with parallel uprights 17, that extend above the frame 10 at its rear end and rigidly connected by a flat cross-piece 18, as shown in Figs. 3 and 7. A plurality of pointed picker-bars 19 are fixed on top of the cross-piece 18 to project forward and to allow stalks of corn to enter between them as they are advanced in line with a row of corn and as required to strip ears from the stalks. At the same time the tread-wheel 13 prevents the roots of the stalks from being lifted from the ground. Curved guards 20 are fixed to the frame to extend outwardly to serve as a means for directing cornstalks inward relative to the picker-bars and also to prevent ears from falling outward when severed from the stalks by the picker-bars.

A rotatable shaft 21 is mounted in bearings at the top ends of the sides 16 of the pivoted frame, that carries two endless carriers and the picker-bars 19, and a rotatable shaft 22 is mounted in bearings at a lower portion of the frame, and the shaft 21 is connected with the shaft 22 by means of a sprocket-wheel 23 on the shaft 21, a sprocket-wheel 24 on the shaft 22, and a chain 25 on the said sprocket-wheels in such a manner that an endless carrier may be connected with each one of said shafts as required to coact in elevating ears from the picker-bars 19 to an inclined conveyer extending laterally and downward from the upper endless carrier.

Flat bars 26 project upward and rearward from the rear ends of the picker-bars 19 and are connected at their upper ends with the rotatable shaft 22 in such a manner that they will, in combination with endless belts 27, that constitute the lower endless carrier, elevate ears from the picker-bars to an upper and second endless carrier.

Sprocket-wheels on the shaft 22 and on a rotatable shaft 28 in bearings at the lower ends of the parallel sides of the pivoted frame support and actuate the endless belts that have fixed teeth to engage the ears of corn.

Knives 29, fixed to the rear ends of the picker-bars, aid in severing the ears from the stalks as the stalks are drawn through between the picker-bars as they are advanced over a row of stalks. A second endless carrier 30 is mounted on a roller fixed to the shaft 21 in bearings fixed to the parallel sides 16 of the pivoted frame that supports the two endless carriers.

To adjust the pivoted frame as required to raise and lower the picker-bars 19 and also to retain it stationary when the picker-bars are in operation or elevated into an inoperative position, a rock-shaft 32 is mounted in bearings fixed to the frame 10 and provided with arms 33, that are connected with the side bars 16 of the pivoted frame by rods 34 as required to suspend the frame from the arms of the rock-shaft and a hand-lever 35, fixed to the end of the rock-shaft and provided with a spring-actuated pawl to engage a rack 36, fixed to the frame 10, for locking the rock-shaft as required to retain the pivoted and suspended frame stationary at different angles relative to the frame and the surface of the ground.

A rotatable shaft 37 is mounted in bearings fixed to the frame 10 and connected with an internal gear-wheel 38, fixed to the driver-wheel 12 by means of a pinion 39. A belt-wheel 40 is fixed to the other end of the shaft and connected with a belt-wheel 41, fixed to the inner end of the shaft 21, to transfer power and motion from the driver-wheel as required to actuate the endless carrier 30 and the endless belts 27 simultaneously for elevating ears of corn from the stripper-bars 19 into the inclined conveyer 42, fixed to the rear end of the frame 10.

A frame composed of mating side bars 43 is fixed to the frame 10 to project forward and upward, and braces 44 are fixed to the top of the frame to support a third endless carrier for elevating ears of corn from the conveyer 42 to the top of a plurality of husking-rollers 46, journaled to the side 43 of the frame in a plane below the endless carrier 45, as shown in Fig. 3, in such a manner that the ears of corn drop from the top of the endless carrier and fall upon the husking-rollers to be stripped of husk as they descend on the rollers and fall therefrom upon the lower end of a fourth endless carrier 47, mounted in a frame 48, that extends outward and upward as required to deliver the husked corn to a wagon advanced at the side of the machine.

A rotatable shaft 48 is mounted in bearings fixed to the sides 43 of the elevator-frame, that supports the carrier 45 and connected with the shaft 37 by means of a sprocket-wheel 49 on the shaft 37, a sprocket-wheel 50 on the shaft 48, and a chain 51 on said sprockets as required for actuating the husking-rollers 46. The two upper husking-rollers are connected by gear-wheels 52 to rotate toward each other as required to pull husks from the ears of corn, and the husking-rollers below them are close enough together to pull off husks that may remain as the ears descend over them to fall on the lower end of the endless carrier 47. A shaft 53, that supports the endless carrier 45, is connected with the shaft 37 by means of a sprocket-wheel 54 on the shaft 53 and a sprocket-wheel 55 on the shaft 37 and a chain 56 on said sprockets as required to actuate the carrier 45 simultaneously with the husking-rollers.

A shaft 57 is mounted in bearings fixed to the frame 10 and connected with the shaft 37 by bevel gear-wheels 58 and 59 and with the carrier 47 by means of belt-wheels 60 61 and a belt 62, as shown in Fig. 1, to actuate the carrier as required to convey the husked corn from the husking-rollers to a wagon.

The pinion 39 is mounted loosely on the shaft 37 and thrown in and out of gear with the wheel 38, fixed to the driver-wheel 12, by means of a lever 63, that has a forked extension 64, that strides the hub of the pinion as required to slide the pinion on the shaft by means of the lever.

Having thus described the purpose of our invention and the construction and function of each element and subcombination and their arrangement and combination, the practical operation and utility of the machine will be readily understood by persons familiar with the art to which it pertains, and

What we claim as new, and desire to secure by Letters Patent, is—

1. In a corn-harvester, a carriage-frame supported upon two wheels, a driver-wheel mounted at one side of the frame and a tread-wheel that is greater in length than diameter mounted in bearers fixed to the other side of the frame and under the frame, and a pivoted frame carrying picker-bars in front of the tread-wheel, arranged and combined for the purposes stated.

2. In a corn-harvester, a carriage-frame supported upon two wheels, a driver-wheel at one side of the frame and a tread-wheel under the other side of the frame, an elevator-frame pivoted to the top and rear portion of the carriage-frame to incline downward and forward over the tread-wheel, an endless carrier mounted in said elevator-frame, means for adjusting said elevator-frame, means for stripping ears of corn from cornstalks attached to the carriage-frame immediately in front of the said pivoted elevator-frame and the said tread-wheel, arranged and combined to operate in the manner set forth for the purposes stated.

3. In a corn-harvester, a carriage-frame supported upon two wheels, a driver-wheel at one side of the frame and a tread-wheel under the other side of the frame, an elevator-frame pivoted to the top and rear portion of the carriage-frame to incline downward and forward over the tread-wheel, an endless carrier mounted in said elevator-frame, means for adjusting said elevator-frame, means for stripping ears of corn from cornstalks attached to the carriage-frame immediately in front of the said pivoted elevator-frame and the said tread-wheel and endless belts for delivering ears of corn to the endless carrier in the pivoted elevator-frame, arranged and combined to operate in the manner set forth for the purposes stated.

4. In a corn-harvester, a carriage, a frame pivoted to the rear and top portion of the carriage to incline forward and downward, means for raising and lowering the front end of the pivoted frame, a plurality of bars fixed to the lower end of the pivoted frame to project forward, endless belts mounted in the lower end portion of the frame and between the fixed bars, an endless carrier mounted in the pivoted frame to extend upward from a plane below the upper ends of the endless belts to coact with the endless belts in elevating ears of corn to a conveyer, a tread-wheel mounted on the carriage-frame below the lower end of the pivoted frame, and a fixed conveyer inclined downward and at right angles from the top of the endless carrier, arranged and combined to operate in the manner set forth for the purposes stated.

5. In a corn-harvester, an elevator-frame pivoted to the rear and top portion of a carriage-frame to incline forward and downward, bars fixed to the lower end of the frame to project forward in parallel position, cutters fixed to the side faces of the bars to project rearward and laterally relative to the bars and a tread-wheel mounted in bearers fixed to the carriage-frame in rear of the lower end of the pivoted frame, arranged and combined to operate in the manner set forth for the purposes stated.

6. In a corn-harvester, a carriage-frame, a tread-wheel for holding cornstalks at one side of the carriage-frame, a pivoted elevator-frame extending over the tread-wheel, an endless carrier in said frame, means for stripping corn from the stalks at the lower end of the pivoted elevator-frame, endless belts for elevating the corn to the endless carrier in the pivoted frame, a fixed conveyer extending downward from the top of the pivoted frame, an endless carrier extending upward and forward from the lower end of said fixed conveyer and a plurality of husking-rollers mounted under the last-mentioned endless carrier, arranged and combined to operate in the manner set forth for the purposes stated.

7. A corn-harvester comprising a carriage-frame mounted on a driver-wheel and a tread-wheel, a frame pivoted to the top and rear corner portion of the carriage-frame, bars fixed to the lower end of the pivoted frame to project forward in parallel positions, cutters fixed to the inside faces of the said bars, endless belts in the lower portion of the pivoted frame extending to the rear ends of said fixed parallel bars, an endless carrier on the pivoted frame extending upward from the endless belts, a fixed conveyer extending inward and downward from the top of the endless carrier in the pivoted frame, an endless carrier in a fixed frame projecting forward and upward from the lower end of said fixed conveyer, a bed of husking-rollers under the endless carrier in the fixed frame, a fixed conveyer at the lower end of the husking-rollers and means for actuating in concert the endless belts, endless carriers and husking-rollers, all arranged and combined to operate in the manner set forth for the purposes stated.

JAMES V. CAMPTON.
WILBUR W. CAMPTON.
WILLIAM CAMPTON.

Witnesses as to James V. Campton and Wilbur W. Campton:
  F. R. LOWERY,
  THOMAS G. ORWIG.

Witnesses as to William Campton:
  W. D. CAMPTON,
  H. C. SANDERS.